May 6, 1924.

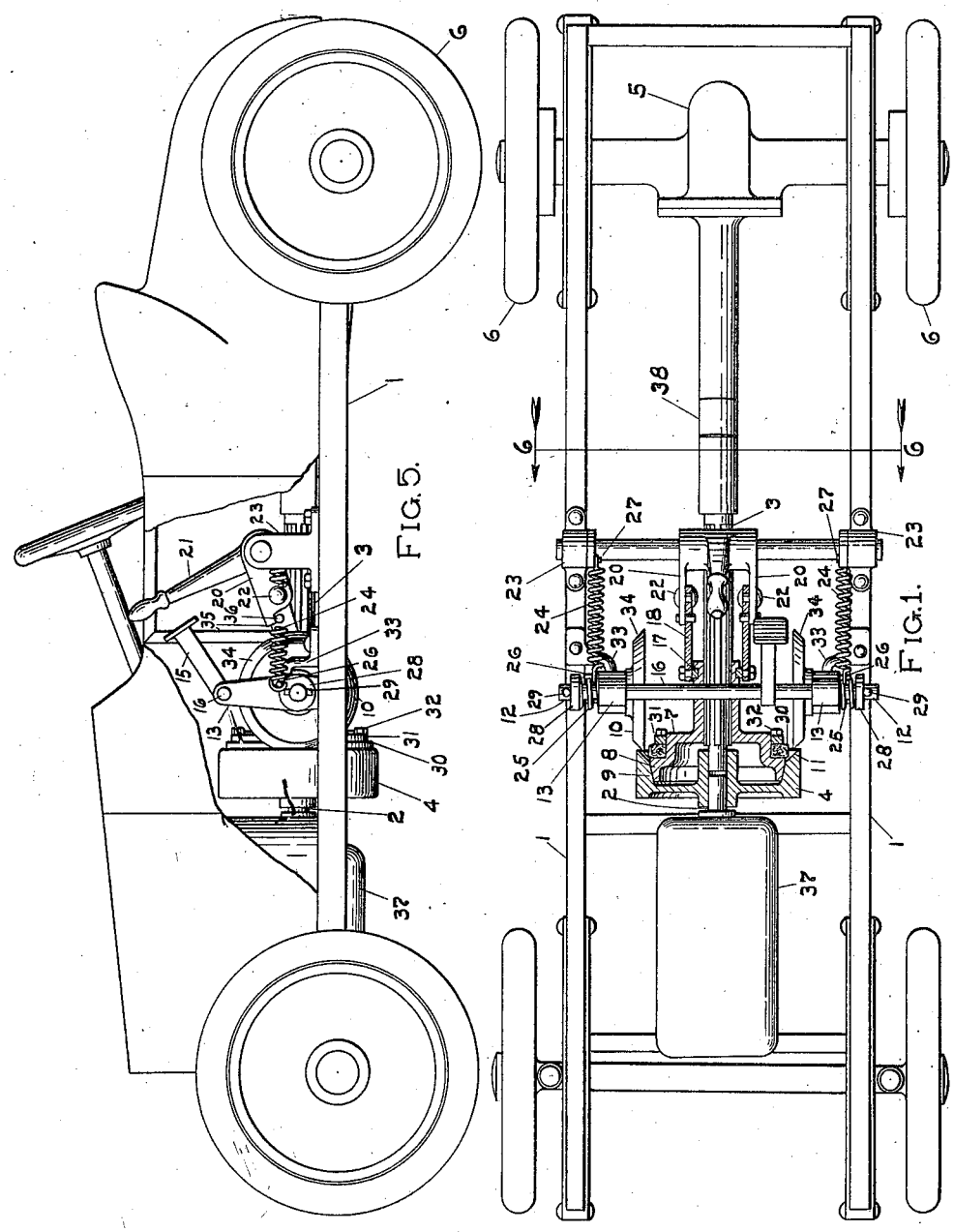

O. H. SPENCER 1,492,863

FRICTIONAL TRANSMISSION MECHANISM

Filed May 2, 1922    3 Sheets-Sheet 2

INVENTOR.
OWEN H. SPENCER
Owen H. Spence

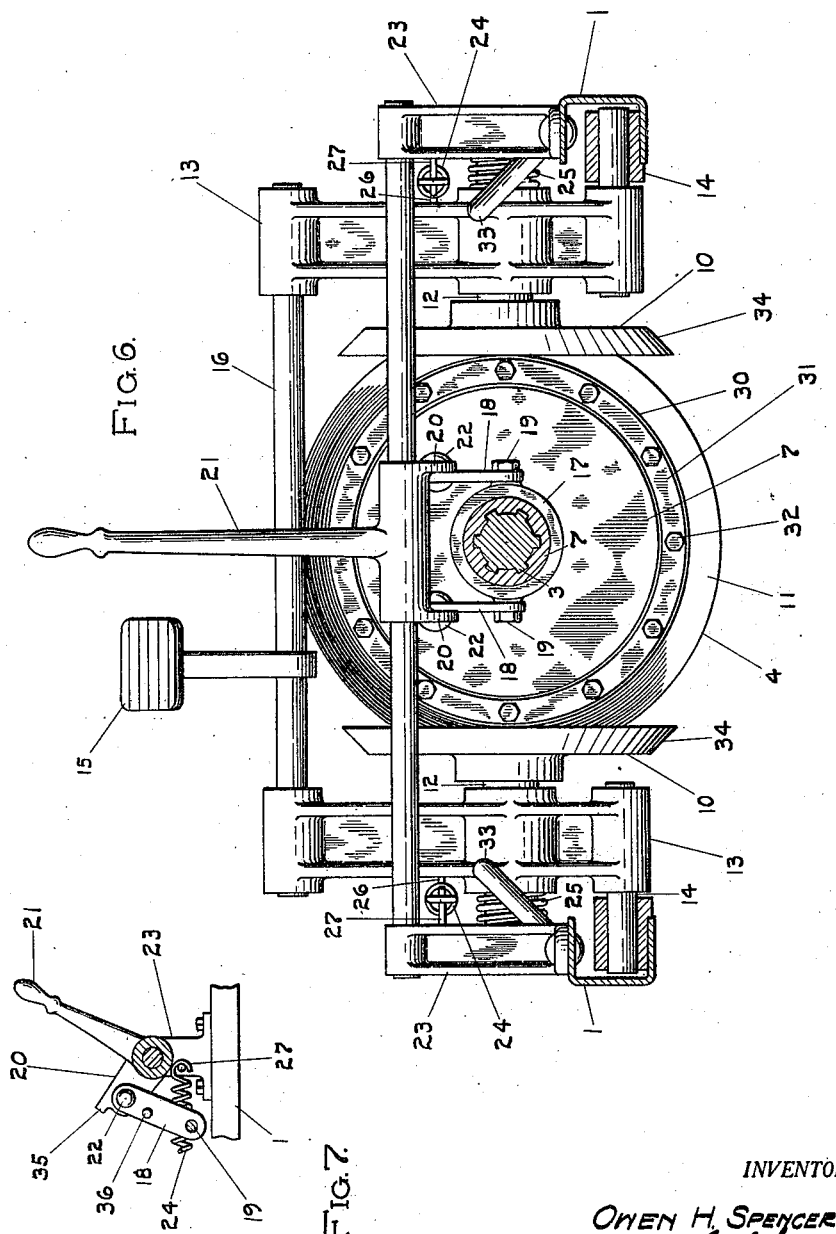

Patented May 6, 1924.

1,492,863

UNITED STATES PATENT OFFICE.

OWEN H. SPENCER, OF INDIANAPOLIS, INDIANA.

FRICTIONAL TRANSMISSION MECHANISM.

Application filed May 2, 1922. Serial No. 557,960.

*To all whom it may concern:*

Be it known that I, OWEN H. SPENCER, a citizen of the United States, residing at Indianapolis, in the county of Marion and State of Indiana, have invented certain new and useful Improvements in Frictional Transmission Mechanisms, of which the following is a specification.

My invention relates to frictional transmission mechanisms and is more especially suited for use in the propulsion of motor vehicles, and consists substantially in the construction, combination and arrangement of parts hereinafter set forth and pointed out particularly in the claims.

An object of this invention is to provide a simple and reliable means for transmitting motion and power from the driving members to the driven members of a self propelled vehicle in a smooth, quiet and effective manner, which will enable the operator to manually vary the relation of speeds between said driving and driven members, and change the direction of rotation of the driven members, without the use of toothed gearing.

It is also an object of this invention, to obtain a direct engagement between the said driving and driven members, when a vehicle is thus propelled at so called high speed, whereby the use of the frictional parts of the mechanism are not required.

It is a primary feature of this invention to provide a master drive wheel, conveniently the motor fly wheel, with what I call an interior conical surface in its rim, to receive tangently, one or more, preferably two, external conical or circular corresponding surfaces, said external conical or circular surfaces being the edges of one or more disc wheels which are revolvable respectively about a line transverse to the motor drive shaft, an object of this feature being that the same exertion which positions the said circular external conical surfaces in frictional contact with said interior conical surface, is partly deflected toward the center line of the motor drive shaft, and thus said tension may be compensated to also confine or interlock a driven friction wheel between said disc wheels, thus held in tangential contact with same, by which combination the operator of the vehicle so propelled may hold all the frictional surfaces of the mechanism in use by the operation of a single lever or foot pedal, preferably foot pedal, regardless of ununiform wear or irregularities in said frictional surfaces.

Figure 4:
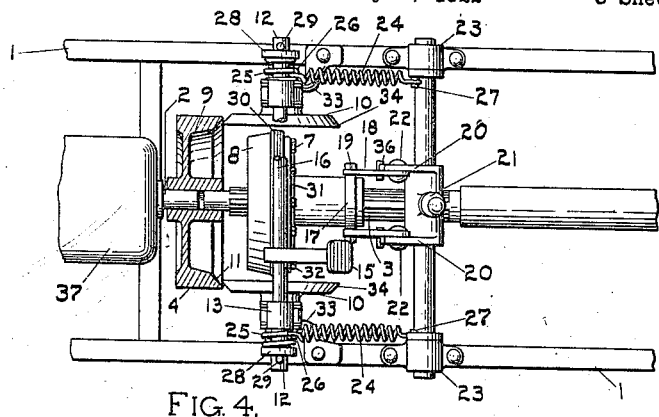
Figure 3:
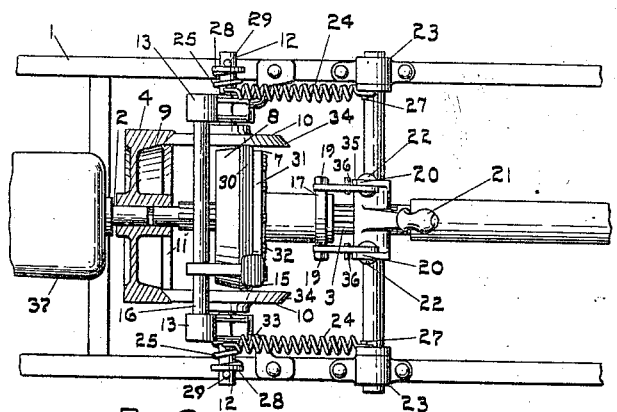
Figure 2:
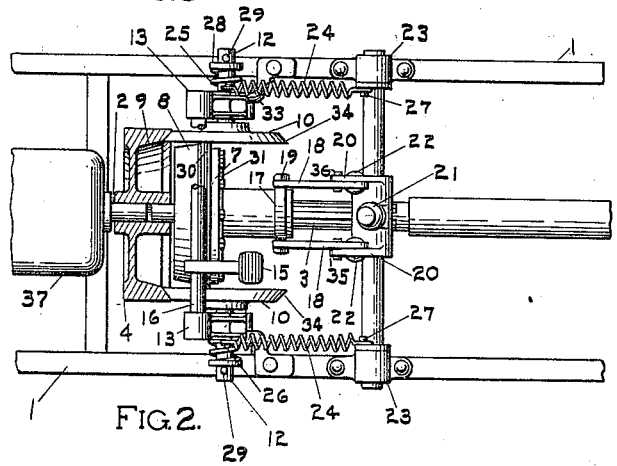

The above and other objects are attained by the structure illustrated in the accompanying drawings, in which Fig. 1 is a sectional plan view of my frictional transmission mechanism, mounted on a suitable vehicle chassis, showing the parts arranged for direct drive. Fig. 2 is a similar view showing the parts arranged for intermediate or lower speed forward. In this view the chassis portion is broken away, showing only the adjacent members of same. Fig. 3 is a similar view showing the position of the parts for reverse drive. Fig. 4 is a similar view, showing the parts at the neutral point. Fig. 5 is a fragmentary side elevation of Fig. 1, illustrating the application of my frictional transmission mechanism to the vehicle as a whole. Fig. 6 is a sectional elevation near line 6—6 on an enlarged scale. Fig. 7 is a detail elevation showing the neutral adjustment of the friction wheel actuating parts.

Referring to characters of reference, 1 designates the frame of the motor vehicle, said frame varying in size and construction, as desired. The motor shaft 2, and the driven shaft 3, are in axial alinement, and independently revolvable about a medial line of the frame 1, as shown in Fig. 1, Fig. 2, Fig. 3, Fig. 4 and Fig. 6, and are disposed in an end to end relationship in the hub of the fly wheel 4, said fly wheel being secured to the motor shaft 2, and rotating constantly therewith. The driven shaft 3, is loosely pivoted at its forward end, in the hub of fly wheel 4, and is free to revolve or remain stationary, independent of said fly wheel. The other end of said driven shaft being connected through the differential 5, to the rear wheels 6, of the vehicle.

Positioned opposite the fly wheel 4, and adapted to coact therewith, under certain conditions, is the cylindrical friction wheel 7, which is splined to the driven shaft 3, and is adapted to slide longitudinally thereon, and rotate constantly therewith. Said friction wheel is constructed to form, on its forward side, the male portion or plug 8, of a usual cone clutch, the female portion or seat 9, of said clutch being formed in the rim of fly wheel 4.

When said clutch is in engagement as shown in Fig. 1 and Fig. 5, the vehicle would be propelled at what is usually known as high speed, a direct drive being thus effected from the motor drive shaft 2, to the driven shaft 3, and said driven shaft revolves substantially as a unit with motor shaft 2.

About a line transverse to the driven shaft 3, are the revolvable intermediate disc wheels 10, the outer edges of which are beveled and the inner vertical flat faces of which stand adjacent to the periphery of friction wheel 7, said disc wheels being movable transversely to their axes, whereby the bevel surfaces of same are brought into contact with the corresponding interior conical surface 11, of the fly wheel 4, and movable longitudinally into contact with the friction wheel 7, said longitudinal movement being caused by the tendency of the disc wheels 10, to shift sideways, and thus to become wedged toward each other, or interlocked, when held in contact with interior conical surface 11, of fly wheel 4. As a means of operating said disc wheels in this manner, the trunnions 12, of the disc wheels 10, are respectively journaled in the rock arms 13, which are movable about their pivots 14, by the foot lever 15, through a common yoke member 16. The pivots 14 are fixed to the frame 1.

When the vehicle is propelled at any other than high speed, or the direction of travel reversed, the motor power is transmitted from the fly wheel 4, through the intermediate disc wheels 10, to the friction wheel 7, and thus to the driven shaft 3.

The speed of travel of the vehicle is relative to the distance between the centers of disc wheels 10, and their respective points of contact with the friction wheel 7, and in reversing the direction of travel of the vehicle the friction wheel 7 is slid longitudinally back beyond the centers of the disc wheels 10, away from the fly wheel 4, as shown in Fig. 3. As a means of shifting the friction wheel 7 to a desirable position along the driven shaft 3, I have provided a ring 17, outwardly disposed on the rear end of the hub of the friction wheel 7, and retained loosely in this relation by a circular groove. Ring 17 is pivoted to the connecting rods 18, by suitable joints 19, the other ends, respectively, of said connecting rods are pivoted to the arms 20, of the manually operated lever 21, by suitable joints 22, forming a pair of toggle joints therewith.

The lever 21 is pivoted to the journals 23, which journals bear a fixed relation to the vehicle frame 1.

By this arrangement the friction wheel 7 may be slid longitudinally upon the splined shaft 3, across the flat inner faces of disc wheels 10, by manipulation of the lever 21.

The contraction coil springs 24, are provided to normally hold the disc wheels 10, out of contact with the fly wheel 4, being then against the inner faces respectively, of the rock arms 13, when the foot lever 15 is released. The forward ends of said springs are attached to the rock arms 13, by the studs 26, fixed respectively to said rock arms. The other or rear ends of said springs are attached to the journals 23 by the hooks 27, fixed respectively to said journals, said journals being mounted on the frame 1 in a fixed relation thereto.

The expansion coil springs 25, are provided at the ends of the trunnions 12, to normally hold said intermediate disc wheels out of contact with the friction wheel 7, when the foot lever 15 is released, said springs being interposed between the collars 28 on the outer ends of the trunnions 12, respectively, and the rock arms 13. The collars 28 are retained on their respective trunnions in this relation by the pins 29, fixed in the extreme outer portions of said trunnions respectively.

The frictional ring 30 of the friction wheel 7, is composed of suitable friction material and is clamped to said friction wheel by a metal ring 31 and screws 32.

When the vehicle is standing still, it is desirable to have the friction wheel 7 at the neutral point, in which adjustment the cylindrical surface of said friction wheel is shifted opposite and between the center portions of the intermediate disc wheels, respectively, as shown in Fig. 4, by manipulation of the lever 21. When the friction wheel 7 is in this position, the foot lever 15 is entirely released. The rock arms 13 are held back against the stop brackets 33, and the intermediate disc wheels 10 are thus held entirely out of contact with the fly wheel 4, and at the same time the expansion coil springs 25, hold the said disc wheels away from the friction wheel 7, by which adjustment the said disc wheels and the friction wheel 7, are rendered entirely inactive. The stop brackets 33 are in fixed relations to the frame 1.

In starting the vehicle on low forward speed, the foot lever 15, is pressed forward, which swings the rock arms 13 on their pivots 14, and thereby presses the bevel or conical surfaces 34, of the intermediate disc wheels 10, into frictional contact with the interior conical surface 11, of the fly wheel 4, whereby motion is imparted to said disc wheels. By pressing sufficiently hard on the foot lever 15, the intermediate disc wheels 10 are cammed sideways by wedge action at their points of contact with the fly wheel 4. This sideways movement causes said disc wheels to shift toward each other and into frictional contact with the cylindrical surface of friction wheel 7, due to the female character of the interior conical surface 11.

By a forward movement of the manually operated lever 21, the friction wheel 7 is slid forward along on the driven spline shaft 3, at the beginning of which movement the cylindrical surface of said friction wheel being slightly in advance of the center portions of the disc wheels 10, is set in rotary motion by its frictional contact with said disc wheels and further forward movement of the lever 21 will further advance the friction wheel 7, whereby the desired low speed is reached by the adjustment shown in Fig. 2. It is apparent that the friction wheel 7 will be rotated at a speed in accordance with the position occupied thereby, relatively to the center of the disc wheels 10, it being understood that the disc wheels 10 have been moved so as to engage both the fly wheel 4 and the friction wheel 7.

When the friction wheel 7 reaches a point close to the fly wheel 4, the shaft 3 is then being rotated at nearly the speed of shaft 2, whereupon the operator may release the foot lever 15, thereby throwing the disc wheels 10, out of operation and into the same position as in neutral. Immediately afterwards the lever 21 may be further advanced, throwing the clutch portion 8, of the friction wheel 7 into direct clutching engagement, with the fly wheel 4, whereupon a direct drive is obtained by the adjustment shown in Fig. 1, causing the said friction wheel 7 and said fly wheel 4 to rotate in unison.

By sliding the friction wheel 7 to the opposite side of the centers of the disc wheels 10, the splined shaft 3 will be driven in a reverse direction to that of shaft 2, by the adjustment shown in Fig. 3, thereby enabling the machine to be backed and the speed of the shaft 3 will be increased or diminished relatively to the speed of the shaft 2, in accordance with the location of the points of contact of the friction wheels 7, with the disc wheels 10, between the center and the periphery of said disc wheels, it being understood that the disc wheels 10, have been moved so as to frictionally engage both the fly wheel 4 and the friction wheel 7, the same as in low forward speed. In this reverse adjustment of the parts the connecting rods 18 are positioned in a somewhat folded relation to the arms 20 of the lever 21, forming an angle therewith, as shown in Fig. 7. This angle becomes greater as the friction wheel 7 is slid closer to the fly wheel 4. When the friction wheel 7 has been shifted into direct clutching engagement with fly wheel 4, the connecting rods 18 are parallel to arms 20 and the toggle formed therewith is straightened. When pressed slightly beyond this position the extensions 35 of the arms 20 bear against the studs 36, which are fixed in the connecting rods 18. This arrangement constitutes a self locking adjustment by which the vehicle may be propelled at high speed without attention to the lever 21.

The interior conical surface 11, of the fly wheel 4, and the external conical surfaces of intermediate disc wheels 10 need not be exactly conical but preferably so.

The motor 37 of the vehicle shown is of the usual explosive type. The use of my invention, however, is not restricted to any certain type of motor.

A universal joint coupling 38 is provided to prevent the disalignment of the splined portion of the driven shaft 3.

I claim as my invention:

1. In a frictional transmission mechanism, the combination of a drive shaft, a driving wheel fixed thereto and having an interior conical surface, circular revolvable disc wheels, each disc wheel having an external conical surface corresponding with the interior conical surface of said driving wheel and adapted to be in contact therewith, a pivoted frame rotatably supporting said disc wheels and adapted to carry said external conical surfaces into contact with said interior conical surface by manually oscillating movement and a spring working in opposition to said movement by which said external conical surfaces are automatically held out of contact with said interior conical surface when manual force is not applied to said frame.

2. In a frictional transmission mechanism, the combination of a driving shaft, a driving wheel non-slidably fixed thereto and having an interior conical surface, circular disc wheels revolvable about a line transverse to the axis of the driving wheel, the peripheral edge of each disc wheel being beveled to correspond with the interior conical surface of the driving wheel and adapted to be in contact therewith, a friction wheel in axial alinement with said drive wheel, a pivoted frame rotatably and slidably journaling said disc wheels and adapted to carry said beveled surfaces against said interior conical surface by approaching oscillation of said frame by which said disc wheels are cammed sideways pressing the flat faces thereof in contact with said friction wheel, and a spring acting in opposition to said approaching oscillation by which said beveled surfaces are automatically withdrawn from said interior conical surface, thereby releasing the pressed contact of said flat faces with said disc wheels.

3. In a frictional transmission mechanism, the combination of a drive shaft, a driving wheel, revolvably fixed thereto and having an interior conical surface, intermediate disc wheels revolvable about a line transverse to the axis of the driving wheel, each intermediate disc wheel having an external conical surface corresponding to the interior conical surface of said driving wheel and adapted to be in contact therewith, a driven friction wheel longitudinally shiftable along a splined shaft in line with the shaft of said driving wheel, means for bringing said interior conical surface into frictional contact with said external conical surfaces, and adapted to also simultaneously cam said disc wheels toward each other, thereby bringing the flat faces thereof into tangent contact with the periphery of said friction wheel, and to also at the same time and by the same camming action, interlock together said drive wheel, said disc wheels and said friction wheel, in rotary frictional relation.

4. A frictional transmission mechanism comprising a drive shaft, a drive wheel fixed thereto and revolvable therewith and having an interior conical surface in its rim, a driven shaft in axial alinement therewith, a friction wheel slidably splined to said driven shaft and rotatable therewith, opposed intermediate disc wheels having peripheral beveled edges corresponding to said interior conical surface and having flat faces toward said driven shaft and pivoted trunnions extending away from said driven shaft, an oscillatable U shaped frame pivoted at the ends thereof astride said driven shaft, the legs of said frame forming journals which slidably and rotatably receive said trunnions by which said frame is adapted by manual manipulation to swing said bevel edges into contact with said interior conical surface, thereby shifting said flat disc faces into contact with the periphery of said friction wheel and springs adapted to oppose said manual manipulation and automatically withdraw said disc wheels from contact with said interior conical surface.

5. In a frictional transmission mechanism, the combination of a motor shaft, a drive wheel fixed thereon and revolvable therewith, and having an interior conical surface in its rim, a driven shaft in axial alinement with said motor shaft, a clutch for connecting said shafts directly, opposed disc wheels having peripheral conical surfaces revolvable about an axial line transverse to the motor shaft and mounted so as to be moved both transversely and longitudinally to their axes, a friction wheel keyed to and mounted to slide upon said driven shaft and adapated to rotate therewith, and means for bringing said interior conical surface into frictional contact with said peripheral conical surfaces, said means adapted to also simultaneously wedge said disc wheels toward each other against said interior conical surface thereby bringing the flat faces thereof into frictional contact with the periphery of said friction wheel, said means adapted to also at the same time equalize and compensate the surface pressure of said frictional contacts and thus interlock together said drive wheel, said disc wheels and said friction wheel in rotary motion transmitting relation.

6. In a frictional transmission mechanism, the combination of a motor shaft, a drive wheel fixed thereon and revolvable therewith, and having an interior conical surface in its rim, a driven shaft in axial alinement with said motor shaft, a clutch for connecting said shafts directly, opposed disc wheels having peripheral conical surfaces, revolvable about an axial line transverse to the motor shaft and mounted so as to be moved both transversely and longitudinally to their axes, a friction wheel keyed to and mounted to slide upon said driven shaft and adapted to rotate therewith, means for pressing said peripheral conical surfaces of said disc wheels into frictional contact with said interior conical surface by extended approaching movement to said interior conical surface, said same pressing means adapted to also simultaneously wedge said disc wheels toward each other against said interior conical surface, thereby bringing the flat faces thereof into frictional contact with the periphery of said friction wheel, by said extended approaching movement said same pressing means adapted to also at the same time equalize and compensate the surface pressure of said frictional contacts by said extended approaching movement and thus interlock together said drive wheel, said disc wheels and said friction wheel in rotary motion transmitting relation.

7. A frictional transmission mechanism, combining a direct and friction drive, said mechanism including a drive shaft, a drive wheel fast to said drive shaft in axial relation thereto, said drive wheel having an interior concentric conical surface in its rim, a driven shaft in end to end coaxial relation with said drive shaft, a clutch mechanism between said shafts, serving to connect one with the other, opposed disc wheels one at each side of said driven shaft, and rotatable in a plane at right angles to said drive wheel, the outer edge of said disc wheels respectively forming external conical surfaces adjacent to the interior conical surface of said drive wheel and adapted to be moved so as to frictionally engage therewith and by the same movement wedge themselves toward each other, means for pressing said external conical surfaces of said disc wheels into tangent relation with said interior conical surface, said means comprising a pair of rock arms, fixed pivots therefor and a connecting yoke member serving to unite same and support a common foot lever, means for automatically withdrawing said disc wheels from wedged adjustment, said means consisting of springs acting against said foot lever to normally hold said disc wheels out of use, and a friction wheel interposed between said disc wheels with its periphery adjacent to the flat faces of same, and adapted to receive frictional contact thereof when said disc wheels are wedged toward each other, said friction wheel being shiftable longitudinally on the said driven shaft and revolvable co-axially with said drive wheel and means for shifting said friction wheel longitudinally on said driven shaft.

8. A frictional transmission mechanism comprising a drive shaft, a drive wheel fixed thereto and revolvable therewith and having an interior conical surface in its rim, opposed intermediate disc wheels having peripheral beveled edges corresponding to said interior conical surface and having flat faces toward said drive shaft and pivoted trunnions extending away from said drive shaft, an oscillatable U shaped frame pivoted at the ends thereof, the legs of said frame forming journals which slidably and rotatably receive said trunnions by which said frame is adapted by manual manipulation to swing said bevel edges into contact with said interior conical surface, and springs adapted to oppose said manual manipulation and automatically withdraw said disc wheels from contact with said interior conical surface.

9. A frictional transmission mechanism, combining a direct and friction drive, said mechanism including a drive shaft, a drive wheel fast to said drive shaft in axial relation thereto, said drive wheel having an interior concentric conical surface in its rim, a driven shaft in end to end co-axial relation with said drive shaft, a clutch mechanism between said shafts, serving to connect one with the other, opposed disc wheels one at each side of said driven shaft, and rotatable in a plane at right angles to said drive wheel, the outer edge of the disc wheels respectively forming external conical surfaces adjacent to the interior conical surface of said drive wheel and adapted to be moved so as to frictionally engage therewith and at the same time be wedged toward each other, means for pressing said external conical surfaces of said disc wheels into tangent relation with the interior conical surface of said drive wheel, said means including a pair of rock arms, fixed pivots therefor and a connecting yoke member for uniting same and supporting a common foot lever and rock arm springs acting against said foot lever to normally hold said disc wheels out of use, means for automatically withdrawing said disc wheels from wedged adjustment in conjunction with said rock arm springs said means including coil springs encircling the trunnions of said disc wheels respectively, and thrust collars and pins for retaining same, a friction wheel interposed between said disc wheels with its periphery adjacent to the flat faces of said disc wheels and adapted to receive frictional contact thereof when said disc wheels are wedged toward each other, said friction wheel being shiftable longitudinally on said driven shaft and revolvable coaxially with said drive wheel, means for shifting said friction wheel longitudinally on said driven shaft said means including a ring encircling the hub of said friction wheel and retained loosely thereon by a circular groove, said ring being provided with oppositely arranged pivots, a hand lever pivoted at one end, a pair of toggle lever sets the free end of which straddles said ring and correspondingly engages the pivots thereof, the other end of said pair of toggle lever sets terminating in pivoted relation to said hand lever.

In testimony whereof I have hereunto set my hand on this the 17th day of April A. D., 1922.

OWEN H. SPENCER.

Witnesses:
CLARENCE W. BAKER,
CHARLES H. MATHIAS.